(12) United States Patent
Strohmann et al.

(10) Patent No.: US 11,423,029 B1
(45) Date of Patent: Aug. 23, 2022

(54) INDEX-SIDE STEM-BASED VARIANT GENERATION

(71) Applicant: Google LLC, Mountain View, CA (US)

(72) Inventors: Thomas Richard Strohmann, Cupertino, CA (US); Dimitra Papachristou, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 432 days.

(21) Appl. No.: 16/710,378

(22) Filed: Dec. 11, 2019

Related U.S. Application Data

(63) Continuation of application No. 12/942,958, filed on Nov. 9, 2010, now abandoned.

(51) Int. Cl.
| | |
|---|---|
| *G06F 7/02* | (2006.01) |
| *G06F 16/00* | (2019.01) |
| *G06F 16/2455* | (2019.01) |
| *G06F 16/25* | (2019.01) |
| *G06F 16/2452* | (2019.01) |
| *G06F 16/951* | (2019.01) |
| *G06F 16/9538* | (2019.01) |
| *G06F 16/33* | (2019.01) |

(52) U.S. Cl.
CPC .. *G06F 16/24564* (2019.01); *G06F 16/24526* (2019.01); *G06F 16/252* (2019.01); *G06F 16/951* (2019.01); *G06F 16/9538* (2019.01); *G06F 16/3338* (2019.01)

(58) Field of Classification Search
CPC ......... G06F 16/24564; G06F 16/24526; G06F 16/951; G06F 16/9538; G06F 16/252; G06F 16/3338
See application file for complete search history.

(56) References Cited

U.S. PATENT DOCUMENTS

| | | |
|---|---|---|
| 5,276,616 A | 1/1994 | Kuga et al. |
| 6,101,492 A | 8/2000 | Jacquemin et al. |
| 6,741,979 B1 | 5/2004 | Tiahrt |
| 7,346,490 B2 | 3/2008 | Fass et al. |
| 7,440,941 B1 | 10/2008 | Borkovsky et al. |
| 7,890,521 B1 | 2/2011 | Grushetskyy et al. |

(Continued)

FOREIGN PATENT DOCUMENTS

WO      2003042859      5/2003

OTHER PUBLICATIONS

Final Office Action issued in U.S. Appl. No. 12/942,958 dated Dec. 7, 2012, 17 pages.

(Continued)

*Primary Examiner* — Bruce M Moser
(74) *Attorney, Agent, or Firm* — Middleton Reutlinger

(57) ABSTRACT

Methods, systems, and apparatus, including computer programs encoded on computer storage media, for index-side synonym expansion. One method includes obtaining a token sequence for a resource and indexing a token in the token sequence. The indexing includes applying one or more stemming rules to the particular token to generate a stemmed form of the token, obtaining a variant of the stemmed form of the token, and storing data associating the resource with both the token and the variant as index terms for the resource in a search engine index.

20 Claims, 3 Drawing Sheets

(56) References Cited

U.S. PATENT DOCUMENTS

| | | | |
|---|---|---|---|
| 8,484,238 B2* | 7/2013 | Loeser | G06F 16/3329 |
| | | | 707/769 |
| 8,515,731 B1 | 8/2013 | Ramirez Robredo et al. | |
| 2002/0032566 A1 | 3/2002 | Tzirkel-Hancock et al. | |
| 2002/0059161 A1* | 5/2002 | Li | G06F 16/319 |
| 2003/0120846 A1 | 6/2003 | Clapper | |
| 2003/0126117 A1 | 7/2003 | Megiddo et al. | |
| 2003/0191625 A1 | 10/2003 | Gorin et al. | |
| 2003/0200199 A1 | 10/2003 | Snyder | |
| 2004/0148170 A1 | 7/2004 | Acero | |
| 2005/0149499 A1 | 7/2005 | Franz et al. | |
| 2005/0198027 A1 | 9/2005 | Hamaguchi | |
| 2005/0222983 A1 | 10/2005 | Schwedes | |
| 2005/0283473 A1 | 12/2005 | Rousso et al. | |
| 2007/0067345 A1* | 3/2007 | Li | G06F 16/951 |
| 2007/0088695 A1 | 4/2007 | Bleyendaal et al. | |
| 2007/0205987 A1 | 9/2007 | Fux et al. | |
| 2007/0288448 A1 | 12/2007 | Datta | |
| 2007/0299855 A1 | 12/2007 | Levin | |
| 2008/0065607 A1 | 3/2008 | Weber | |
| 2008/0071757 A1 | 3/2008 | Ichiriu et al. | |
| 2008/0205775 A1 | 8/2008 | Brinker | |
| 2008/0263019 A1 | 10/2008 | Harrison et al. | |
| 2009/0055380 A1 | 2/2009 | Peng et al. | |
| 2009/0089277 A1 | 4/2009 | Cheslow | |
| 2009/0327302 A1 | 12/2009 | Richardson et al. | |
| 2010/0179801 A1 | 7/2010 | Huynh et al. | |
| 2011/0231423 A1 | 9/2011 | Lopiano | |
| 2013/0151501 A1 | 6/2013 | Wang et al. | |
| 2020/0267163 A1* | 8/2020 | Wilson | H04L 9/3271 |

OTHER PUBLICATIONS

Final Office Action issued in U.S. Appl. No. 12/942,958 dated May 18, 2015, 18 pages.

Larkey et al., "Improving stemming for Arabic information retrieval: light stemming and co-occurrence analysis," In Proceedings of the 25th annual international ACM SIGIR conference on Research and development in information retrieval (SIGIR '02). ACM, New York, NY, USA, Aug. 2002, pp. 275-282.

mit.edu, Natural Language Tools. 2010. http://web.archive.org/web/20100420052323/http://csc.media.mit.edu/docs/conceptnet/nl.html.

Non-Final Office Action issued in U.S. Appl. No. 12/942,958 dated Jul. 19, 2012, 16 pages.

Non-Final Office Action issued in U.S. Appl. No. 12/942,958 dated Jul. 3, 2014, 16 pages.

Notice of Allowance issued in U.S. Appl. No. 12/942,965 dated Oct. 10, 2012, 8 pages.

Notice of Allowance issued in U.S. Appl. No. 13/460,852 dated Feb. 4, 2015, 16 pages.

Office Action issued in U.S. Appl. No. 12/942,967 dated Jul. 18, 2014, 17 pages.

Office Action issued in U.S. Appl. No. 12/942,967 dated Mar. 30, 2012, 16 pages.

Office Action issued in U.S. Appl. No. 12/942,967 dated Oct. 26, 2012, 17 pages.

Office Action issued in U.S. Appl. No. 12/942,965 dated Apr. 26, 2012, 26 pages.

Office Action issued in U.S. Appl. No. 12/942,965 dated Dec. 7, 2012, 5 pages.

Office Action issued in U.S. Appl. No. 12/942,967 dated Jan. 29, 2015, 20 pages.

Office Action issued in U.S. Appl. No. 13/460,582 dated Mar. 25, 2014, 11 pages.

Office Action issued in U.S. Appl. No. 13/460,582 dated Oct. 28, 2014, 15 pages.

Office Action issued in U.S. Appl. No. 13/761,920 dated Dec. 9, 2014, 12 pages.

Office Action issued in U.S. Appl. No. 13/761,920 dated Jul. 29, 2014, 17 pages.

Office Action issued in U.S. Appl. No. 13/761,920 dated Jul. 21, 2015, 15 pages.

* cited by examiner

INDEX-SIDE STEM-BASED VARIANT GENERATION

CROSS REFERENCE TO RELATED APPLICATION

This patent application is a continuation (and claims the benefit of priority under 35 USC 120) of U.S. patent application Ser. No. 12/942,958, filed Nov. 9, 2010. The disclosure of the prior application is considered part of (and is incorporated by reference in) the disclosure of this application.

BACKGROUND

This specification relates to identifying resources relevant to search queries submitted to a search engine.

Search engines identify digital resources (e.g., Web pages, images, text documents, multimedia content) that are responsive to search queries, and provide information on the identified resources. In general, search engines match terms of the search queries to terms in the resources or metadata associated with the resources to determine which resources are responsive to which queries.

Multiple words can be used to describe a similar concept (for example, "car," "cars," "automobile," and "automobiles"). The word used in or to describe a particular resource may not exactly match the word used in a search query. Therefore, to identify additional resources relevant to search queries, some conventional search engines perform query expansion, augmenting search queries with synonyms for words in the queries. For example, a search query for "red car" could be augmented to be "red (car OR cars OR automobile OR automobiles)," because "car," "cars," "automobile," and "automobiles" have similar meanings. However, because search queries often include multiple terms, and each term in a search query can have multiple synonyms, it can be difficult to add all relevant synonyms to a received search query.

SUMMARY

This specification describes technologies relating to indexing resources and identifying resources responsive to user search queries.

To reduce the amount of query expansion that needs to be done when a search query is received from a user, a search system augments its search index with synonyms for words found in resources. Specifically, the search system adds stem-based variants of words in a resource to a search engine index. The search system then augments received queries with information needed to match the augmented index.

In general, one innovative aspect of the subject matter described in this specification can be embodied in methods that include the actions of obtaining a token sequence for a resource, wherein the token sequence comprises tokens extracted from the resource; and indexing a particular token in the token sequence, the indexing comprising: applying one or more stemming rules to the particular token to generate a particular stemmed form of the particular token; obtaining a variant of the particular stemmed form of the particular token, wherein the variant of the particular stemmed form of the particular token is a pre-selected representative token in a group of tokens each having a stemmed form matching the particular stemmed form; and storing data associating the resource with both the particular token and the variant as index terms for the resource in a search engine index. Other embodiments of this aspect include corresponding systems, apparatus, and computer programs recorded on computer storage devices, each configured to perform the operations of the methods.

These and other embodiments can each optionally include one or more of the following features. The token sequence comprises tokens extracted from the resource or from metadata for the resource. The variant of the particular stemmed form is different from the stemmed form. The variant of the particular stemmed form is different from the particular token. The particular stemmed form of the particular token is not a word in a language of the resource. The pre-selected representative token in the group of tokens is a token in the group of tokens that appears the most frequently in a group of resources. The actions further include associating the particular token and the variant with each other in the search engine index. The actions further include determining a language of the resource, wherein the one or more stemming rules are specific to the language.

The actions further include storing data indicating that the variant is a stem-based variant. Storing data indicating that the variant is a stem-based variant comprises adding a prefix to the variant before associating the resource with the variant in the search engine index, wherein the prefix identifies the variant as a stem-based variant.

The actions further include receiving a search query comprising one or more tokens; generating a stemmed form of a first token in the search query; obtaining a search token variant of the stemmed form of the first token in the search query; and augmenting the query with the search token variant. The actions further include determining that the search token variant is different from the first token; and augmenting the search query comprises augmenting the search query to include both the search token variant and the search token variant with information identifying the search token variant as a search token variant. The actions further include determining that the search token variant is the same as the first token; and augmenting the search query comprises augmenting the search query to include the search token variant with information identifying the search token variant as a search token variant. The actions further include assigning a weight to each token in the augmented search query, including assigning a weight to the search token variant so that resources matching the first token in the search query are weighted more highly than resources matching the variant and not the first token in the search query.

Particular embodiments of the subject matter described in this specification can be implemented so as to realize one or more of the following advantages. Resources responsive to search queries can be identified, even when the resources do not contain the exact words used in the search queries. Resources responsive to search queries can be identified without adding a large number of synonyms to search queries.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
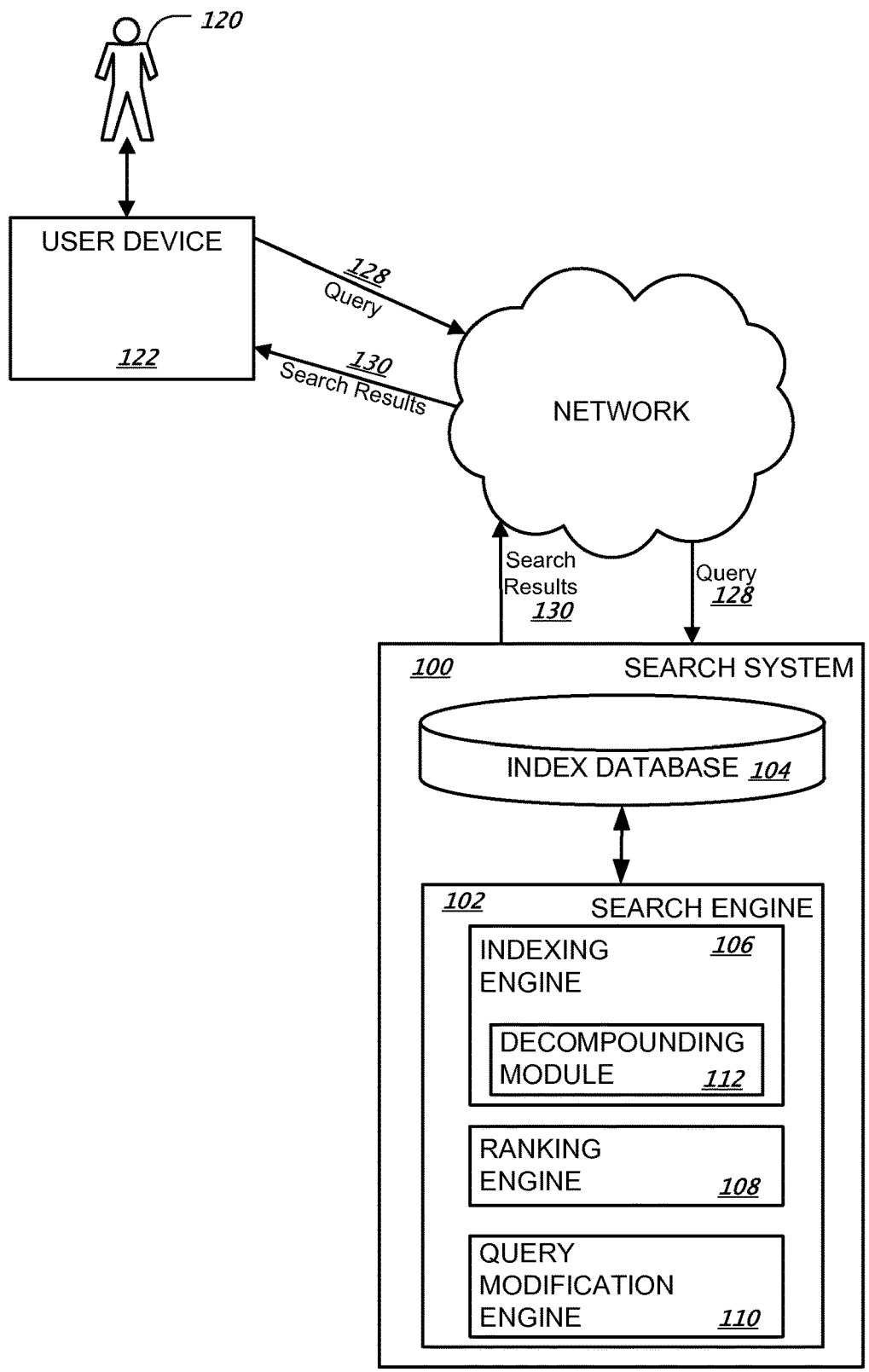
FIG. 1 illustrates an example prior art search system for providing search results relevant to submitted queries.

FIG. 1 illustrates an example prior art search system 100 for providing search results relevant to submitted queries as can be implemented in an Internet, an intranet, or another client and server environment. The search system 100 can be implemented as, for example, computer programs running on one or more computers in one or more locations that are coupled to each other through a network.

The search system 100 includes a search engine 102 and an index database 104. The search engine 102 includes an indexing engine 106 that indexes resources found in a corpus, a ranking engine 108, or other software to rank the resources that match user queries, and a query modification engine 110 to modify queries received from users. A corpus is a collection or repository of resources. Resources are, for example, web pages, images, or news articles. In some implementations, the resources are resources on the Internet The ranking engine 108 ranks the resources that match user queries. The ranking engine 108 ranks the resources, for example, using conventional techniques.

The indexing engine 106 receives information about the contents of resources, e.g., tokens appearing in the resources that are received from a web crawler, and indexes the resources by storing index information in the index database 104. While one index database 104 is shown in FIG. 1, in some implementations, multiple index databases 104 can be built and used. The indexing engine 106 indexes the contents of resources, for example, using conventional techniques and using a decompounding module 112.

The decompounding module 112 identifies compound tokens in the text of resources and decompounds each compound token. For example, the decompounding module 112 can decompound a compound token, resulting in two or more decompounded tokens. The decompounding module 112 then stores data associating each of the decompounded tokens with the appropriate resources. A token is a string of characters separated from other characters by white space, e.g., spaces, tabs or hard returns, or punctuation. A compound token is a token containing two or more sub-tokens each having semantic meaning. For example, if a resource contained the token "firehouse," the decompounding module would associate the resource with the tokens "fire" and "house" in the index database 104. The decompounding module 112 identifies and decompounds compound tokens, for example, using conventional methods. If a compound can be decompounded in multiple ways, the decompounding module 112 can associate all of the possible decompounded tokens with the resource in the index database 104. For example, if the compound "useswords" appears in the index, the decompounding module 112 can associate the decompounded tokens "use" and "swords" as well as the decompounded tokens "uses" and "words" with the resource in the index.

In some implementations, the indexing engine 106 and the decompounding module 112 associate a resource with both the compound token and its corresponding decompounded tokens. For example, a resource containing the token "firehouse" would be associated with the tokens "firehouse," "fire," and "house" in the index database 104. In some implementations, the decompounding module 112 also stores data associating the decompounded tokens with the compound token from which they were identified. For example, "fire" and "house" could be associated with the token "firehouse." The decompounding module 112 can also store data indicating the order of the tokens in the compound, e.g., data indicating that "fire" came before "house" in the compound token "firehouse."

In some implementations, the decompounding module 112 also stores data in the index that identifies each decompounded token as having been identified from a compound token in a resource. For example, the decompounding module 112 can add a prefix to each decompounded token that identifies the token as having been identified from a compound token in the resource.

A user 120 interacts with the search system 100 through a user device 122. For example, the device 122 can be a computer coupled to the search system 100 through a local area network (LAN), a wide area network (WAN), e.g., the Internet, or a wireless network, or a combination of them. In some implementations, the search system 100 and the user device 122 can be the same computer. For example, a user can install a desktop search application on the user device 122. The user device 122 will generally be a computer.

When the user 120 submits a query 128 to the search engine 102 within the search system 100, the query 128 is transmitted through a network, if necessary, to the search engine 102.

The search engine modifies the query using the query modification engine 110 as appropriate. In implementations where decompounded tokens are marked in the index database to distinguish them from tokens in their original form, the query modification engine 110 modifies the query to include both the tokens of the query and the tokens of the query with data identifying them as decompounded tokens. For example, if a user searches for "fire fighter station," the query modification engine could modify the query to be "(fire OR *dc*fire) (fighter OR *dc*fighter) (station OR *dc*station)," where "*dc*" is the prefix used to denote decompounded tokens that appear in the resource as part of a longer compound token. The query modification engine 110 can also make other conventional modifications to the query.

In some implementations, before modifying the query, the query modification engine 110 determines whether to modify the query, for example, by evaluating one or more criteria. For example, the query modification engine 110 can determine whether the query is longer than one word and is expected to get less than a threshold number of results. If so, the query modification engine 110 modifies the query; otherwise, the query modification engine does not modify the query. As another example, the query modification engine 110 can determine whether a particular token is an entity name, e.g., by comparing the token to a list of known entity names. The query modification engine 110 can then only add the token, with data identifying the token as a decompounded token, to the query when the token is not an entity name.

The search engine 102 uses the index database 104 to identify resources that match the tokens of the modified query. The search engine 102 transmits search results 130 identifying the highest-ranked matching resources through the network to the user device 122, for example, for presentation to the user 120 (e.g., in a search results web page that is displayed in a web browser running on the user device 122).

Figure 2:
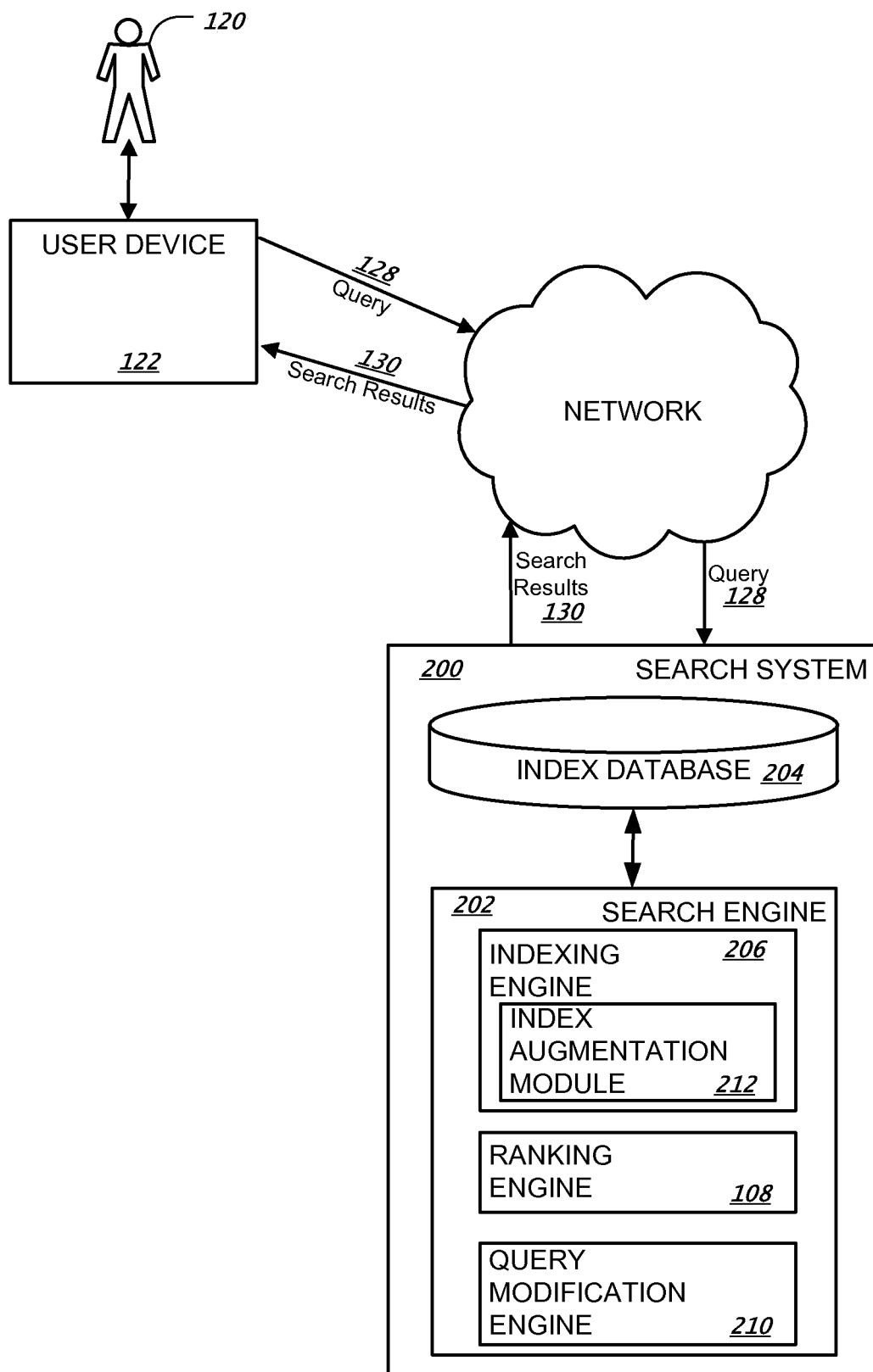
FIG. 2 illustrates an example search system with an augmented index.

FIG. 2 illustrates an example search system 200 with an augmented index database 204. While a single index database 204 is shown in FIG. 2, in some implementations, multiple index databases can be built and used using the methods described below.

Like the prior art search system 100 described above with reference to FIG. 1, the search system 200 provides search results relevant to submitted queries and can be implemented in an Internet, an intranet, or other client and server environment. However, the search system 200 differs from the prior art search system 100 described above with reference to FIG. 1 in at least two ways.

First, instead of a decompounding module 112, the search system 200 has a stem-based variant index augmentation module 212. The stem-based variant index augmentation module 212 adds additional information to the index database 204 other than decompounded versions of tokens found in resources. Specifically, the stem-based variant index augmentation module 212 processes the text of resources and resource metadata to generate a stemmed form of each of one or more of the tokens in the resources or in the resource metadata. The stem-based index augmentation module adds a variant of each stemmed form to the index database 204. Adding variants of stemmed forms of tokens to the index database 204 is described in more detail below with reference to FIG. 3.

Second, the query modification engine 210 in the system 200 modifies queries differently than the query modification engine 110 does. These modifications are described in more detail below with reference to FIG. 4.

Figure 3:
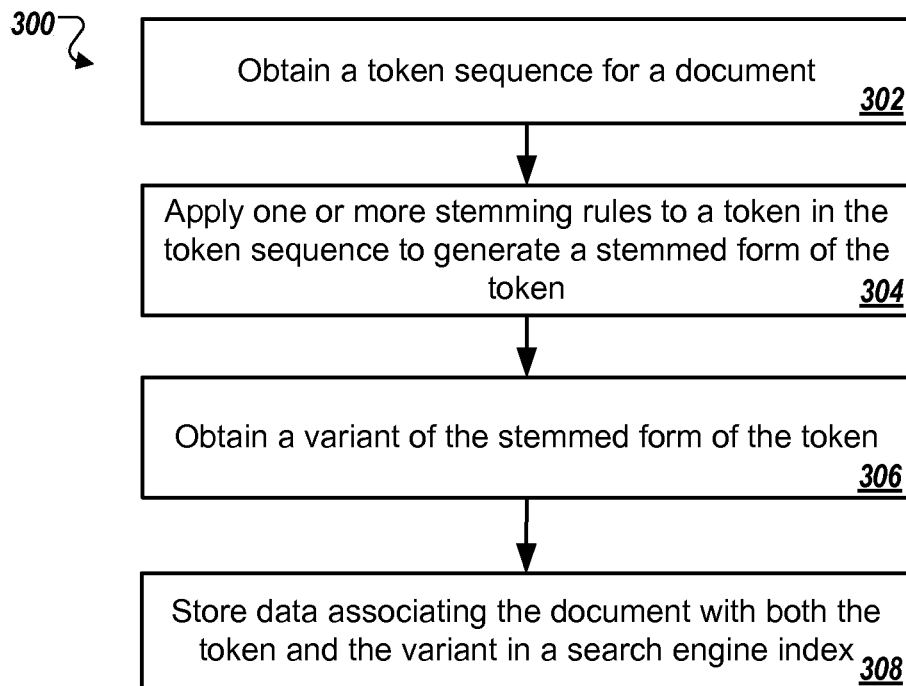
FIG. 3 is a flow chart of an example method for augmenting an index with stem-based variant information.

FIG. 3 is a flow chart of an example method 300 for augmenting an index with stem-based variant information. For convenience, the method 300 is described in reference to a system of one or more computers that performs the steps of the method. The system can be, for example, the search system 200 described above with reference to FIG. 2.

The system obtains a token sequence for a resource (302). The token sequence is made up of tokens extracted from the resource or metadata for the resource. In some implementations, the tokens in the token sequence are ordered, e.g., according to their relative positions in the resource. For example, a resource containing the phrase "I love puppies— they are adorable" would have the ordered token sequence ["I" "love" "puppies" "they" "are" "adorable"]. The sequence of tokens can be obtained, for example, from a web crawler that is part of the system, or from a separate system.

The system then indexes the tokens in the token sequence. For at least one token in the token sequence, the system performs the following steps to index the token. In some implementations, the system performs the following steps to index each token in the token sequence.

The system applies one or more stemming rules to the token to generate a stemmed form of the token (304). In general, a stemming rule maps one affix, e.g., a prefix or a suffix, to another affix. Stemming rules can be rules that indicate mappings from one word form to a valid stem, or from one word form to another valid word form. For example, in English, the stemming rule {"*es"→"*"} indicates that one could drop the "es" suffix. Similarly, the stemming rule {"*s"→"*"} indicates that one could drop the "s" suffix. As yet another example, the stemming rule {"*ing"→"e"} indicates that one could replace the "ing" suffix with an "e" suffix. As a final example, the stemming rule {"de*"→"*"} indicates that one could drop the "de" prefix.

The stemming rules can be obtained, for example, using conventional methods including manual formulation or refinement of existing rules. In some implementations, the stemming rules can be generated from an analysis of words identified as being possible synonyms that likely have the same, or a similar, meaning. The system, or another system, obtains pairs of words that are possible synonyms based on their appearance together, for example, in documents or in query sessions. If query session data is used, the data is preferably anonymized to protect user privacy. Once the pairs of possible synonyms are identified, the system then generates rules for words that share common parts, i.e., prefixes, suffixes, or middle sections, and differ in other parts, i.e., prefixes, suffixes, or middle sections. The word form rules are rules that specify transitions between the differing parts of word pairs that share a common part. For example, if the system identified "car" and "cars" as two possible synonym terms, the system could generate the stemming rule {"*s"→"*"} because "car" and "cars" share the common part "car" and differ only in the suffix of the words. An example method for generating the stemming rules is described in U.S. patent application Ser. No. 12/027, 559, filed on Feb. 7, 2008, which is incorporated herein by reference.

In some implementations, the stemming rules are specific to particular languages and the system determines the language of the resource and then applies the appropriate stemming rules for the language. For example, a rule for the English language could be {"*ypsies"→"*ypsy"}, while a rule for the German language could be {"*ypsies"→"ypsies"}.

In some implementations, the system applies the stemming rules in a particular order. For example, the system could apply the rule {"*es"→"*"} before the system applies the rule {"*s"→"*"}. The order of the stemming rules can be obtained, for example, using conventional methods, including manual formulation or refinement of existing rules.

For at least some tokens, the stemmed form of the token is different from the token itself. For example, the stem of the word "voting" is "vot." For at least some tokens, the stemmed form of the token is not a word in the language of the resource. For example, the English token "voting" has the stem "vot." However, "vot" is not a word in the English language. At least some of the stemmed forms can be words in the language in the resource. For example, the English token "friendship" has the stem "friend." "Friend" is a word in the English language.

The system obtains a variant of the stemmed form of the token (306). The variant of the stemmed form of the token is pre-selected from a group of tokens each having a stemmed form matching the stemmed form of the token. The pre-selected token is a representative token of the group. In some implementations, the pre-selected token is the token in the group of tokens that appears the most frequently in a group of resources, e.g., the resources being indexed.

In some implementations, the variant of the stemmed form of the token is always different from the stemmed form of the token. In other implementations, the variant can be different from the stemmed form, but is not necessarily different. Consider an example where the stemmed form of the token is a word in the language, e.g., the stem "friend." If "friend" meets the criteria for being the representative token, then the system could pre-select "friend" to be the representative token for the set of tokens having the stemmed form "friend." In some cases, the variant does not appear in the resource.

The system stores data associating the resource with both the token and the variant in a search engine index (308). The token and the variant are stored as index terms for the resource. For example, the system can store information in an index database such as the index database 204 described above with reference to FIG. 2. In some implementations, the system denotes the variant as being a stem-based variant, e.g., by storing data indicating that the variant is derived from the stem of a token. For example, the system can add a prefix to the variant that indicates that it is a stem-based variant before associating the variant with the resource.

In some implementations, before the system stores data associating the resource with the variant, the system determines that the variant is different from the token. If the token and variant are different, the system stores data associating the resource with the variant. If the token and variant are the same, the system can only associates the token with the resource, and does not separately associate the variant with the resource. This saves space in the search engine index by avoiding duplicate associations.

In some implementations, the system further associates the token with the variant in the index. For example, the system can store data indicating that the token and the variant correspond to the same token in the resource.

While the foregoing description describes adding a variant of the stem to the index, in other implementations, the system adds the stem itself, rather than obtaining and adding the variant. Also, while the foregoing description describes adding a single variant of the stem to the index, in other implementations, multiple variants can be added.

Figure 4:
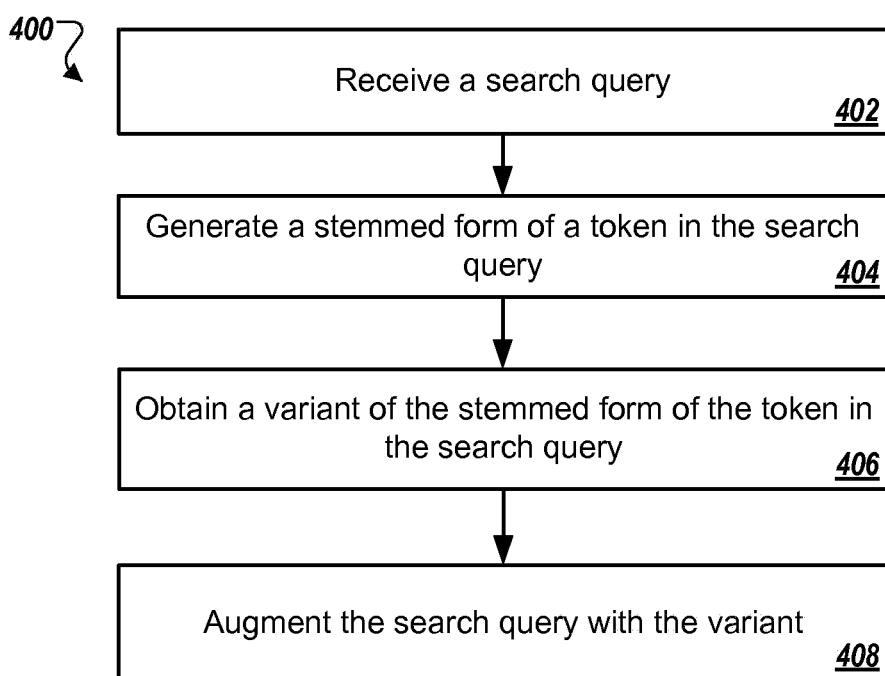
FIG. 4 is a flow chart of an example method for augmenting a query with information needed to retrieve information from an index augmented with stem-based variant information.

FIG. 4 is a flow chart of an example method 400 for augmenting a query with information needed to retrieve information from an index augmented with stem-based variant information. For convenience, the method 400 is described in reference to a system of one or more computers that performs the steps of the method. The system can be, for example, the search system 200 described above with reference to FIG. 2.

The system receives a search query (402), for example, as described above with reference to FIG. 1. The search query contains one or more tokens. The system performs the following steps for one or more of the tokens in the query. The system generates a stemmed form of a token in the search query (404), for example, by applying the stemming rules described above with reference to FIG. 3. The system obtains a variant of the stemmed form of the token in the search query (406), for example, as described above with reference to FIG. 3. The system augments the search query with the variant (408). This augmentation causes the search engine to identify resources matching the tokens of the query or the variant as responsive to the query.

In some implementations, the system augments the search query with the variant by adding the variant to the search query. If the search engine index denotes variants, for example, using a prefix, the system can add both the variant, and the variant with the prefix that denotes it as being a variant, to the query. The system adds the variant without the prefix to account for the fact that if the variant was the same as the token in the resource, the system does not separately add the variant to the index, but instead just adds the token itself. Consider an example where the search query is "election vote," the system is processing the token "vote," and "voting" is the pre-selected representative token for all tokens having the stem "vot." The system would modify the search query "election vote" to be "election (vote OR voting OR *sv*voting)," where "*sv*" is a prefix used to denote a stemmed variant.

If the query token is the same as the variant, the system can just add the variant, with the information identifying the variant as being a variant, to the query, and not add the variant by itself. Consider an example where the search query is "election voting," the system is processing the token "voting," and "voting" is the pre-selected representative token for all tokens having the stem "vot." In this example, the system would modify the search query "election voting" to be "election (voting OR *sv*voting)."

In some implementations, the system assigns weights to the tokens in the augmented query. For example, the system can assign less weight to the tokens added to the query than to the tokens in the received query to reflect the fact that variants generally have at least slightly different meanings than their corresponding original tokens, and therefore may not be exactly what the user who submitted the search query intended. Consider an example where a first resource and a second resource are identical, except that the first resource contains the tokens in the received query and the second resource does not contain the tokens in the received query and instead contains the variant tokens added to the query. If the variant tokens added to the query are assigned less weight than the tokens in the received query, the first resource will be ranked more highly than the second resource. In some implementations, the amount of the difference between the weights that the system assigns to the tokens added to the query and the tokens already in the query is derived from one or more factors of the query itself, for example, the length of the query. For example, the system can assign a greater difference in weights to tokens identified for shorter queries than to tokens identified for longer queries. Alternatively or additionally, the amount of the difference between the weights can be derived from a measure of similarity of meaning between the token in the original query and other tokens sharing the same stem. A high measure of similarity can lead to a smaller decrease in weight than a low measure of similarity.

In some implementations, before augmenting the query, the system determines whether the query should be augmented. For example, the system could evaluate a criterion that specifies that if the query only contains one token, the query should not be augmented. As another example, the system can evaluate a number of predicted results for the original query. If the number of predicted results satisfies a threshold, the system can determine not to augment the query. In such implementations, the system only augments the query if the result of the evaluation of the one or more criteria indicates that the query should be augmented. Alternatively or additionally, the system can evaluate one or more criteria regarding an individual token of the query to determine whether to add a variant of the individual token to the query. For example, the system can determine whether the token is a name of an entity, e.g., by comparing the token to a list of entity names, and can decide to not generate a variant for the token if it is an entity name. As another example, the system can determine whether the token has less than a threshold length, e.g., one character. If so, the system can not add a variant of the token to the query.

While the foregoing description describes adding a variant of a token to the query, in other implementations, the system adds the stem itself, rather than obtaining and adding the variant. Also, while the foregoing description describes adding a single variant of the stem of the token to the query, in implementations where multiple variants are stored in the index, the system can add one, some, or all of the variants to the query.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
   one or more computers; and
   one or more computer-readable media storing instructions that, when executed by the one or more computers, cause the one or more computers to perform operations comprising:
   receiving, by the one or more computers, a search query provided by a user device over a communication network, the search query comprising one or more tokens;
   generating, by the one or more computers, a stemmed form of a first token in the search query using one or more stemming rules;
   obtaining, by the one or more computers, a representative token for the first token, wherein the representative token is a pre-selected search token variant of the stemmed form of the first token in the search query;
   augmenting, by the one or more computers, the query with the representative token to obtain an augmented query;
   identifying, by the one or more computers, resources relevant to the augmented query using a search engine index of content of multiple resources, the search engine index comprising, for each of the multiple resources, data indicating (i) tokens in the resource, (ii) a representative token for each of one or more of the tokens for which a corresponding representative token has been selected, and (iii) for each representative token that is different from the token in the resource, a prefix identifying the representative token as a stem-based variant of a token in the resource and as not being an actual token in the resource; and
   providing, by the one or more computers and to the user device over the communication network, one or more search results indicating one or more resources identified as relevant to the augmented search query.

2. The system of claim 1, wherein the representative token for the first token has been pre-selected for a group of tokens that each have a corresponding stemmed form that matches the stemmed form of the first token, the representative token being a token designated in the group of tokens with the same stemmed form that appears most frequently in a group of resources.

3. The system of claim 1, wherein the data indicating the tokens of the multiple resources indicates tokens from the resources and tokens from metadata for the resources.

4. The system of claim 1, wherein the representative token for the first token is different from the stemmed form of the first token.

5. The system of claim 1, wherein the stemmed form of the token is not a word in a language of the search query.

6. The system of claim 1, wherein the operations further comprise associating the token and the representative token with each other in the search engine index.

7. The system of claim 1, wherein the operations further comprise determining a language of the search query, wherein the one or more stemming rules are specific to the language.

8. The system of claim 1, wherein:
   the operations further comprise determining that the representative token for the first token is different from the first token; and
   augmenting the search query comprises augmenting the search query to include both (i) the representative token for the first token and (ii) the representative token for the first token with a prefix identifying the representative token for the first token as a search token variant.

9. The system of claim 1, wherein:
   the operations further comprise determining that the representative token for the first token is the same as the first token; and
   augmenting the search query comprises augmenting the search query to include the representative token for the first token with a prefix identifying the representative token for the first token as a search token variant.

10. The system of claim 1, wherein the operations further comprise assigning a weight to each token in the augmented search query, including assigning a weight to the representative token for the first token so that resources matching the first token in the search query are weighted more highly than resources matching the representative token for the first token and not the first token in the search query.

11. A method performed by one or more computers, the method comprising:
   receiving, by the one or more computers, a search query provided by a user device over a communication network, the search query comprising one or more tokens;
   generating, by the one or more computers, a stemmed form of a first token in the search query using one or more stemming rules;
   obtaining, by the one or more computers, a representative token for the first token, wherein the representative token is a pre-selected variant of the stemmed form of the first token in the search query;

augmenting, by the one or more computers, the query with the representative token to obtain an augmented query;

identifying, by the one or more computers, resources relevant to the augmented query using a search engine index of content of multiple resources, the search engine index comprising, for each of the multiple resources, data indicating (i) tokens in the resource, (ii) a representative token for each of one or more of the tokens for which a corresponding representative token has been selected, and (iii) for each representative token that is different from the token in the resource, a prefix identifying the representative token as a stem-based variant of a token in the resource and as not being an actual token in the resource; and providing, by the one or more computers and to the user device over the communication network, one or more search results indicating one or more resources identified as relevant to the augmented search query.

12. The method of claim 11, wherein the representative token for the first token has been pre-selected for a group of tokens that each have a corresponding stemmed form that matches the stemmed form of the first token, the representative token being a token designated in the group of tokens with the same stemmed form that appears most frequently in a group of resources.

13. The method of claim 11, wherein the data indicating the tokens of the multiple resources indicates tokens from the resources and tokens from metadata for the resources.

14. The method of claim 11, wherein the representative token for the first token is different from the stemmed form of the first token.

15. The method of claim 11, wherein the stemmed form of the token is not a word in a language of the search query.

16. The method of claim 11, comprising associating the token and the representative token with each other in the search engine index.

17. The method of claim 11, comprising determining a language of the search query, wherein the one or more stemming rules are specific to the language.

18. The method of claim 11, comprising determining that the representative token for the first token is different from the first token; and
wherein augmenting the search query comprises augmenting the search query to include both (i) the representative token for the first token and (ii) the representative token for the first token with a prefix identifying the representative token for the first token as a search token variant.

19. The method of claim 11, comprising determining that the representative token for the first token is the same as the first token; and
wherein augmenting the search query comprises augmenting the search query to include the representative token for the first token with a prefix identifying the representative token for the first token as a search token variant.

20. One or more non-transitory computer-readable media storing instructions that, when executed by the one or more computers, cause the one or more computers to perform operations comprising:

receiving, by the one or more computers, a search query provided by a user device over a communication network, the search query comprising one or more tokens;

generating, by the one or more computers, a stemmed form of a first token in the search query using one or more stemming rules;

obtaining, by the one or more computers, a representative token for the first token, wherein the representative token is a pre-selected variant of the stemmed form of the first token in the search query;

augmenting, by the one or more computers, the query with the representative token to obtain an augmented query;

identifying, by the one or more computers, resources relevant to the augmented query using a search engine index of content of multiple resources, the search engine index comprising, for each of the multiple resources, data indicating (i) tokens in the resource, (ii) a representative token for each of one or more of the tokens for which a corresponding representative token has been selected, and (iii) for each representative token that is different from the token in the resource, a prefix identifying the representative token as a stem-based variant of a token in the resource and as not being an actual token in the resource; and providing, by the one or more computers and to the user device over the communication network, one or more search results indicating one or more resources identified as relevant to the augmented search query.

* * * * *